(No Model.) 3 Sheets—Sheet 1.

W. KENT.
MEANS FOR AND METHOD OF MAKING CORRUGATED HEADERS FOR WATER TUBE BOILERS.

No. 373,743. Patented Nov. 22, 1887.

Witnesses
S. S. Williamson
Julian H. Sterling

Inventor
William Kent
By Smith and Hubbard
Attys.

(No Model.) 3 Sheets—Sheet 2.
W. KENT.
MEANS FOR AND METHOD OF MAKING CORRUGATED HEADERS FOR WATER TUBE BOILERS.
No. 373,743. Patented Nov. 22, 1887.
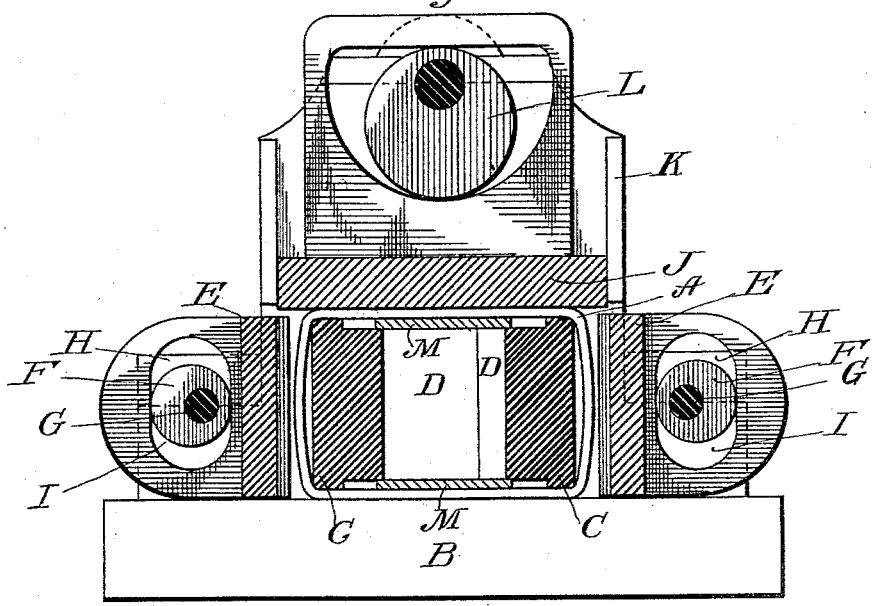
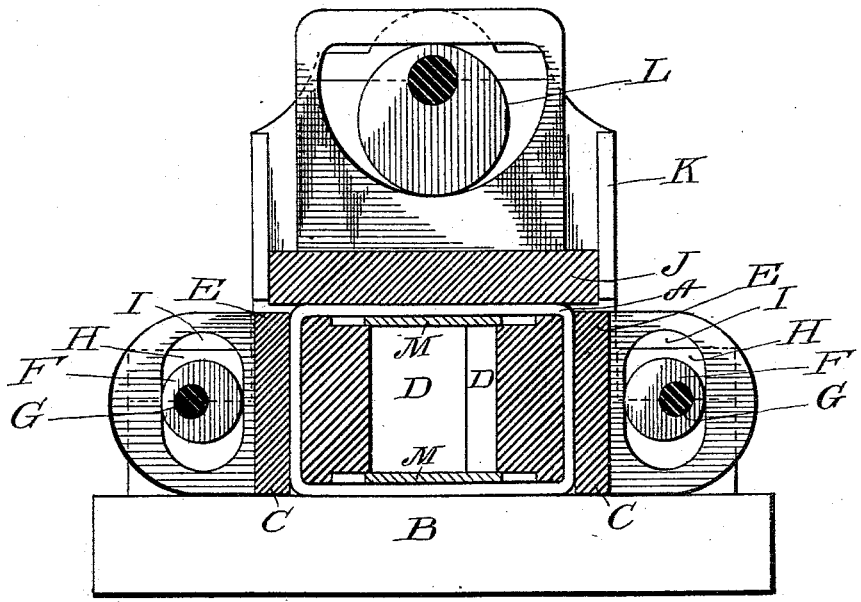
Witnesses
S. S. Williamson
Julian H. Sterling
Inventor
William Kent
By Smith and Hubbard
Attys.

(No Model.) 3 Sheets—Sheet 3.
W. KENT.
MEANS FOR AND METHOD OF MAKING CORRUGATED HEADERS FOR WATER TUBE BOILERS.
No. 373,743. Patented Nov. 22, 1887.
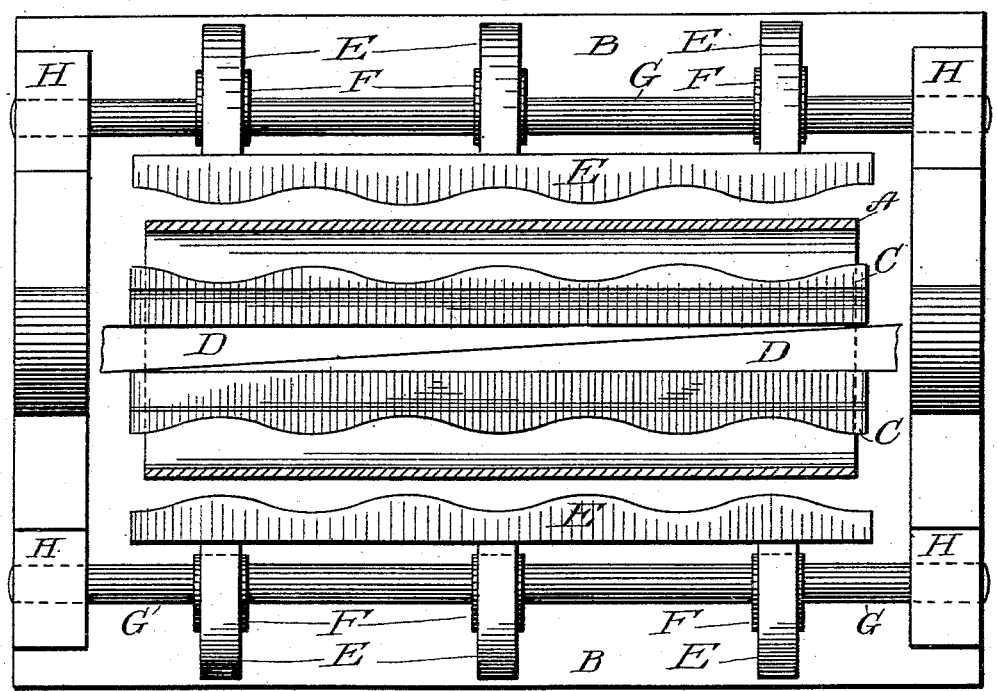
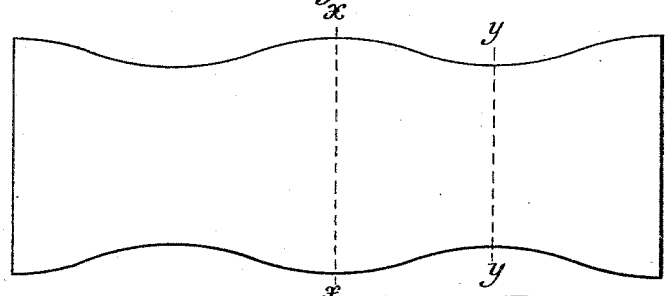
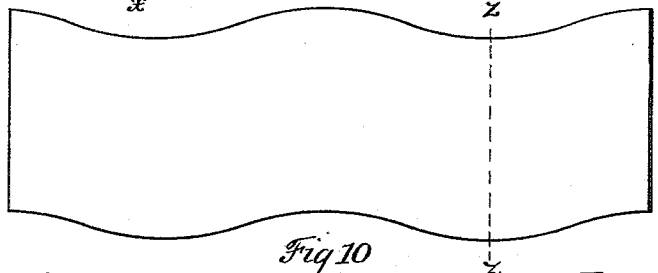
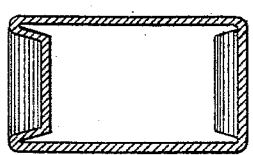
Witnesses
S. S. Williamson
Julian H. Sterling
Inventor
William Kent
By Smith and Hubbard
Attys.

UNITED STATES PATENT OFFICE.

WILLIAM KENT, OF JERSEY CITY, NEW JERSEY.

MEANS FOR AND METHOD OF MAKING CORRUGATED HEADERS FOR WATER-TUBE BOILERS.

SPECIFICATION forming part of Letters Patent No. 373,743, dated November 22, 1887.

Application filed May 16, 1885. Serial No. 165,705. (No model.)

*To all whom it may concern:*

Be it known that I, WILLIAM KENT, a citizen of the United States, residing at Jersey City, in the county of Hudson and State of New Jersey, have invented certain new and useful Improvements in Making Corrugated Headers for Water-Tube Boilers; and I do hereby declare the following to be a full, clear, and exact description of the invention, such as will enable others skilled in the art to which it appertains to make and use the same.

My invention relates to certain novel and useful improvements in means for making corrugated headers for water-tube boilers, and has for its object to provide a header of this description by simple and effective means; and with these ends in view my invention consists in the details of construction and combination of elements, hereinafter fully described, and then specifically designated by the claims.

In order that those skilled in the art to which my invention appertains may more fully understand the same, I will proceed to describe it in detail, referring by letter to the accompanying drawings, forming a part of this specification, in which—

Figure 1:
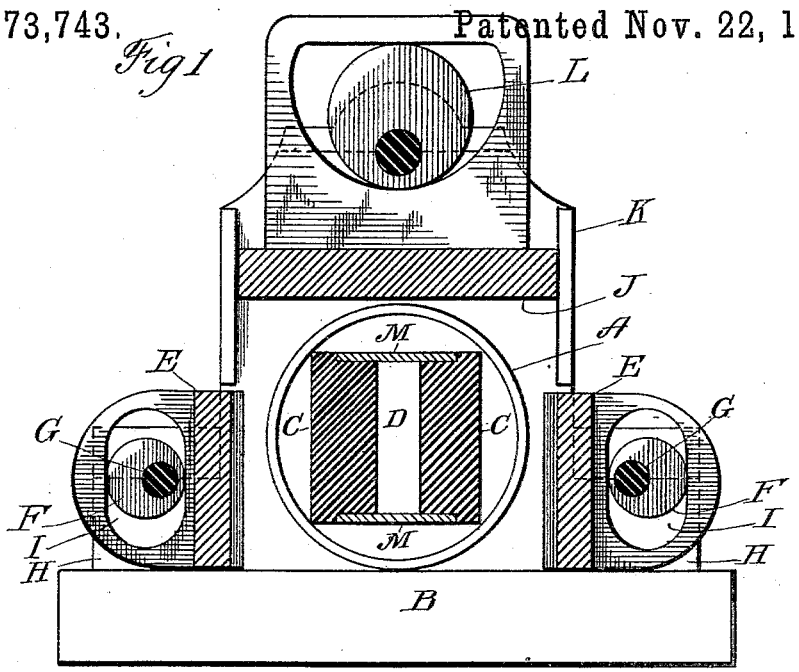
Figure 2:
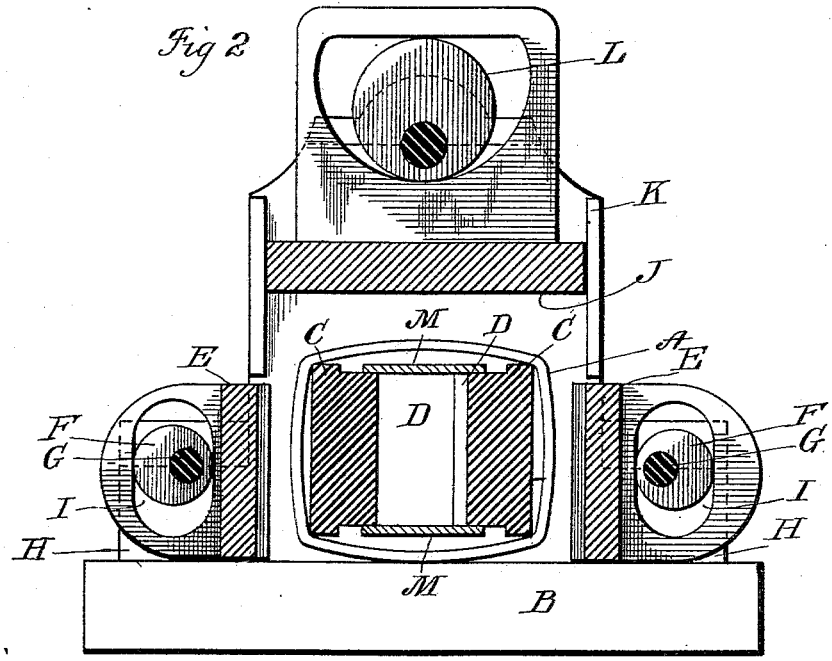

Figure 1 is a view, in part cross-section and elevation, showing the position of the several parts with relation to the tube before the latter is operated upon; Fig. 2, a similar view showing the position of the parts after the tube has been partially shaped by the action of the mandrels; Fig. 3, a similar view, but showing the tube flattened by the presser-block preparatory to the formation of the corrugations; Fig. 4, a similar view showing the position of the several parts after the tube has been completely bent and corrugated; Fig. 5, a horizontal section through the tube, the dies, mandrels, operating-cams, and wedges being in plan; Figs. 6 and 7, elevations of different styles of headers; Figs. 8 and 9, sections at the lines *x x* and *y y* of Fig. 6, and Fig. 10 a section at the line *z z* of Fig. 7.

Similar letters denote like parts in the several figures of the drawings.

In carrying out my improvement I take a round tube, A, place it upon a bed-plate, B, and insert within it mandrels C, corrugated transversely, and between the mandrels I force wedges D in opposite directions.

E are dies which are adapted to slide in bearings (not shown) in the bed, said dies being arranged on opposite sides of the tube and having on their inner faces corrugations corresponding, as male and female, to the corrugations in the mandrels. These dies are operated in any suitable manner; but, as a preferred means, I have shown a series of cams, F, mounted upon a shaft, G, supported in bearings H, projecting from the bed, said cams operating within a recess, I, in the die-frame.

J is a presser-block directly above the tube, and adapted to be reciprocated vertically within proper bearings in a frame, K, which latter may be cast with or bolted to the bed.

L is a cam mounted on a shaft journaled within said frame and adapted to operate the presser-block in the same manner as was set forth in the instance of the dies.

M are cover-plates, which are placed within the tube above and below the mandrels.

The operation of my improvement is as follows: The mandrels are first forced apart by the wedges to the limit to which they (the mandrels) may be expanded without stretching the tube, thereby decreasing the vertical dimension of the tube and increasing its horizontal cross-dimension and changing its form in cross-section from a cylinder to an oblong and causing the vertical sides of this oblong pipe to approach nearer to each other and become substantially parallel with the vertical plane of the dies and mandrels, all of which is clearly shown at Fig. 2. The presser-block is now forced down against the tube, thereby flattening the latter and slightly increasing the horizontal diameter of the same, as illustrated at Fig. 3. The dies are now forced inward against the sides of the tube, thereby driving said sides against the corrugations in the mandrels, the latter previously having been thrown still farther apart a distance equal to the increase of the horizontal diameter caused by the operation of the presser-block, all of which is clearly shown at Fig. 4. The wedges are now withdrawn, thereby permitting the mandrels to be readily removed.

By experiment the amount of stock in the sides of the tube, after the mandrels have been forced apart the proper distance, becomes a predetermined factor, so that when once it is ascertained how much stock is necessary for the formation of the corrugations it is a simple matter in tubes of the same size to so regulate the operation of the mandrels that the same amount of stock for the sides will be left in every instance.

Having thus described my invention, what I claim as new, and desire to secure by Letters Patent, is—

1. The method herein described of making corrugated headers for water-tube boilers, the same consisting in forming a tube round in cross-section into the desired shape by first changing the round tube into an oblong shape in cross-section and subsequently forming transverse corrugations therein, substantially as set forth.

2. A machine for forming corrugated headers for water-tube boilers from a round tube, consisting of a presser-block and bed-plate, a pair of mandrels capable of distention and contraction within the tube, and a pair of dies arranged one on each side of the tube and adapted to be forced against the latter, said mandrels and dies having corresponding transverse corrugations, substantially as shown and described.

In testimony whereof I affix my signature in presence of two witnesses.

WILLIAM KENT.

Witnesses:
S. S. WILLIAMSON,
H. T. SHELTON, Jr.